United States Patent [19]

Sears

[11] 3,856,845
[45] Dec. 24, 1974

[54] ETHERIFICATION OF BARK EXTRACTS AND CONDENSED TANNINS

[75] Inventor: Karl David Sears, Shelton, Wash.

[73] Assignee: International Telephone and Telegraph Corporation, New York, N.Y.

[22] Filed: Aug. 21, 1972

[21] Appl. No.: 282,333

[52] U.S. Cl. ...... 260/465.9, 260/124 R, 260/465 F, 260/473.5, 252/8.5 R, 252/308
[51] Int. Cl. ........................ C08b 5/02, C08h 5/00
[58] Field of Search ......... 260/124 R, 465 F, 465.9, 260/473.5

[56] References Cited
UNITED STATES PATENTS

| | | | |
|---|---|---|---|
| 2,816,100 | 12/1967 | Walker | 260/124 R |
| 2,819,291 | 11/1958 | Heininger | 260/465 F |
| 3,470,148 | 9/1969 | Allan | 260/124 R |

*Primary Examiner*—Lewis Gotts
*Assistant Examiner*—D. R. Phillips
*Attorney, Agent, or Firm*—James B. Raden; Harold J. Holt

[57] ABSTRACT

Polyphenolic extracts of coniferous tree barks and condensed tannins from wood such as quebracho extracts are etherified by reaction at elevated temperature in the presence of an alkaline catalyst with an olefin containing a nitrile functional group. A particularly effective olefin is acrylonitrile. The reaction products are produced in high yield, are water or alkali soluble, act as good dispersants and possess chemical properties offering a variety of additional potential uses.

5 Claims, No Drawings

ETHERIFICATION OF BARK EXTRACTS AND CONDENSED TANNINS

The present invention relates to etherified polyphenolic derivatives of coniferous bark extracts and condensed tannin wood extracts.

Bark from coniferous trees is essentially a waste by-product of lumbering and pulping operations. Certain uses have been made of bark but the available supply still far exceeds the demand. New uses and outlets for coniferous bark products are therefore constantly being sought, not only for the economic advantages that would flow from the successful use of a waste product, but also because of the very favorable impact that the conversion of a waste material into a useful product would have on the pollution problem.

The cyanoethylation of phenols at elevated temperatures in the presence of alkaline catalysts is known. It is also known that the alkaline extract resulting from the digestion of coniferous bark can be converted into water-soluble derivatives by reaction with a variety of chemical compounds. However, the reactions of the complex polyphenolic extracts from tree barks differ in many important respects from those of phenols and the types and conditions of reaction are quite dissimilar. In so far as is known, the preparation of cyanoethylated compounds from bark phenolics has never previously been accomplished, nor is such a compound known nor its process of preparation.

It is accordingly a principal object of the present invention to provide a new class of useful compositions from bark extracts and from condensed tannins from wood.

It is an additional object of this invention to provide a new class of water-soluble compositions which form good dispersants and have a number of other potentially valuable uses.

It is still an additional object of this invention to provide a process for readily obtaining high yields of such compositions in a relatively simple, economical process.

It has now been discovered that the polyphenolic extracts of coniferous tree barks and condensed tannin extracts from wood can be converted into water-soluble etherified polyphenolic derivatives by reacting the polyphenolics at an elevated temperature in the presence of an alkaline catalyst with an olefin containing a nitrile functional group or with the salts of such olefin. Starting materials are the alkaline or sulfited extracts obtained from coniferous tree bark and condensed tannin extracts obtained from wood and/or barks. The reaction products are water or alkali soluble polyphenolic ethers that are useful as dispersants in drilling mud formulations and possess reactive cyano or carbonyl groups making them potentially valuable for a number of applications or as intermediates for the production of useful end products.

The bark extract used as a starting material in the process of the present invention may be the alkaline extract obtained by digesting coniferous barks as disclosed in U.S. Pat. Nos. 2,782,241, 2,819,295 or 2,823,223, all assigned to the present assignee. The sulfited or sulfonated extract may be the type shown in U.S. Pat. No. 2,831,022, assigned to the present assignee. The latter patent discloses the digestion of coniferous barks at elevated temperatures in the presence of suitable amounts of a salt of sulfurous acid until most of the sulfurous acid salt radical is consumed and then drying the sulfonated bark extract. Preparation of these materials leads principally to the extraction of the polyphenolic flavanoid fractions — condensed tannin related materials — from the bark. The condensed tannin extracts useful in the invention are commercially available products such as hot water extracts from quebracho wood.

In the etherification reaction, the bark polyphenolic or condensed tannin reacts with the vinyl group of the olefin at one or more of the active hydroxy hydrogens. The olefin will, in general, conform to the following formula

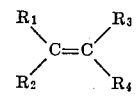

in which $R_1$ and $R_2$ are the same or different and may be H, alkyl, carbonyl, carboxylate ester or carboxylate salt; $R_3$ is H, OH, alkyl, alkenyl, oxyalkyl or oxyalkenyl; and $R_4$ is either a nitrile or carbonyl group such as

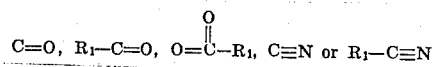

In the above formula, the alkyl group may be methyl, ethyl propyl, etc. and the alkenyl group may be vinyl, allyl, isopropenyl, butenyl and so forth. Illustrative cyano or carbonyl functional olefins in addition to acrylonitrile and acrolein, are vinyl acetate, maleic anhydride and α-methylacrylonitrile. Additional, but less preferred olefins (or olefin salts) are methyl methacrylate, acrylic acid, disodium maleate and diethylmaleate.

The process of producing etherified polyphenolics will vary somewhat depending upon the specific olefin and polyphenolic starting materials used and the nature of the product desired. More specifically, the activated olefin and polyphenol in aqueous solution, or solid form, and catalyst, such as NaOH, are reacted together for from about 0.5 to 4.0 hours at a temperature of from about 110° to 260° C. preferably from about 150° to 190° C., and corresponding pressures. The alkaline catalyst can be added as such or an alkaline extract can be used which contributes alkalinity. The alkaline catalyst, such as Na or K hydroxide, is added in catalytic amounts — preferably one mole of hydroxide per mole of monomeric unit in the polyphenolic. This will normally be 10 percent by weight based on the weight of the extract and the pH will normally be from 9 to 10. Upon completion of the reaction, any unreacted reagents are removed from the mixture as by boiling and the product recovered by a convenient method such as freeze drying. The ratio of olefin to polyphenol is not particularly critical, mole/mole ratios of olefin to monomeric unit in the polyphenolic ranging from one to ten having been tested successfully. Little gain in yield or substitution level in most cases is attained, however, by the use of ratios in excess of about 4.0 to 5.0. This was not true in the case of acrolein where the weight of reaction product increased linearly as the amount of acrolein used increased. Other conditions remaining the same, the olefin substitution level will vary, within limits, with the amount added. The type of vegetative polyphenolic extract used also does not appear to be particularly critical. Successful etherification levels have been accomplished on alkaline bark extracts, sulfited bark extracts and on quebracho wood extracts. When using acrolein or acrylonitrile, yields as high as 90 to 95 percent of theoretical are readily obtained in each case.

The following examples are illustrative of the practice of the invention.

EXAMPLE 1

This example illustrates the reaction of a western hemlock polyphenolic alkaline bark extract with acrylonitrile. The extract was prepared by digesting the tree bark in an alkaline solution and then drying. Acrylonitrile (18.4 ml., 14.7 g.) and the alkaline extract (40 g.) in water (400 ml.) were placed in an autoclave, sealed and heated with stirring for 2 hours at 150° C. The solution was removed and transferred to a flask and boiled for 0.5 hour to remove excess unreacted acrylonitrile. One-quarter of the solution was removed and freeze-dried to produce 11.68 g. of reaction product.

EXAMPLE 2

A commercial sample of quebracho tannin (40 g.) in water (400 ml.) was adjusted to pH 9 with 50% NaOH solution (3.3 ml.). This solution along with acrylonitrile (36.4 ml., 29.3 g.) was transferred to an autoclave and heated with stirring for 2 hours at 150° C. The solution was removed and transferred to a flask and boiled for 0.5 hour to remove excess unreacted acrylonitrile. One-quarter of the solution was removed and freeze-dried to produce 13.8 g. of reaction product.

The results of the foregoing examples are set forth in the following Tables I and II.

EXAMPLE 3

This example and Example 4 illustrate the reaction of acrylonitrile with a mildly sulfited bark extract. The extract is prepared by digestion of coniferous tree bark in an aqueous sulfurous acid solution having a pH of 5.8 followed by concentration and spray drying. Acrylonitrile (8.6 ml., 3.6 g.) and the extract (20 g.) were added to water (200 ml.) to give a pH 5.9 solution that was placed in an autoclave, sealed and heated with stirring for 2 hours at 150°. The solution was removed and transferred to a beaker and boiled for 0.5 hour to remove excess unreacted acrylonitrile. The sample was freeze-dried to yield 18.2 g.

EXAMPLE 4

The bark extract of Example 3 (20 g.) in water (200 ml.) was adjusted to pH 9 (3.2 ml. 18.5% NaOH solution). Acrylonitrile (9.2 ml., 7.3g.) was added and the solution placed in an autoclave and heated with stirring for 3 hours at 150° C. The solution was transferred to a beaker and boiled for 0.5 hour to remove excess unreacted acrylonitrile. After cooling, the solution was adjusted to pH 3.5 and then electrodialyzed prior to freeze-drying, 18.1 g.

The results of the preparation of a number of samples in accordance with Examples 3 and 4 are set forth in the following Table III.

TABLE I

Cyanoethylation of Bark Extract in Autoclave[a]

| Sample No. | Temp., °C. | Time, Hr. | $CH_2=CH-CN$ g. | $CH_2=CH-CN$ mole/mole of extract | Total N, % | $CH_2=CH-CN$ Incorporation[c] % | Yield[d] g. | Yield[d] % |
|---|---|---|---|---|---|---|---|---|
| 1 | 110 | 2 | 14.7 | 2.16 | 4.4 | 62 | 49.1 | 90 |
| 2 | 130 | 2 | 14.7 | 2.16 | 6.0 | 85 | 52.5 | 96 |
| 3 | 150 | 2 | 14.7 | 2.16 | 6.3 | 89 | 53.1 | 97 |
| 4 | 170 | 2 | 14.7 | 2.16 | 6.3 | 89 | 53.1 | 97 |
| 5 | 150 | 2 | 29.4 | 4.32 | 9.1 | 85[b] | 63.1 | 94 |
| 6 | 150 | 2 | 44.1 | 6.48 | 9.4 | 88[b] | 63.9 | 95 |
| 7 | 150 | 0.5 | 14.7 | 2.16 | 6.0 | 85 | 52.5 | 96 |
| 8 | 150 | 1 | 14.7 | 2.16 | 6.0 | 85 | 52.5 | 96 |
| 9 | 150 | 4 | 14.7 | 2.16 | 6.0 | 93 | 53.7 | 98 |

[a]Starting weight of extract was 40 g. with Na content of 10%. Molecular weight (Mw) of 312/monomeric unit assumed for extract.
[b]Based on limiting factor of 4.00 equivalents added.
[c]Based on nitrogen analysis of product.
[d]Based on yield of product compared with total weight of starting material.

TABLE II

Cyanoethylation of Quebracho Tannin[a]

| Sample No. | Temp. °C. | $CH_2=CH-CN$ g. | $CH_2=CH-CN$ Mole/Mole of Quebracho[b] | Total N % |
|---|---|---|---|---|
| 1 | 150° | 29.4 | 3.78 | 7.9 |
| 2 | 170° | 29.4 | 3.78 | 9.7 |

[a]Rnx time 2 hours
[b]Based on a Mw of 273/monomeric unit for Quebracho

TABLE III

Cyanoethylation of Sulfited Extract in Autoclave[a]

| Sample No. | $CH_2=CH-CN$ g. | Mole/Mole of Extract[c] | pH | Yield Wt. %[b] | Total N, % | Acrylonitrile Incorporation | |
|---|---|---|---|---|---|---|---|
| | | | | | | As % of Acrylonitrile Dosage[d] | As % of Theoret. Maximum[e] |
| 1 | 3.6 | 1.14 | 5.9 | 90.8 | 1.8 | 45 | 18 |
| 2 | 7.3 | 2.28 | 5.9 | 94.6 | 2.7 | 39 | 26 |
| 3 | 10.9 | 3.42 | 5.9 | 97.0 | 3.1 | 33 | 30 |
| 4 | 14.6 | 4.56 | 5.9 | 98.8 | 3.4 | — | 33 |
| 5 | 7.3 | 2.28 | 9.0 | 90.5 | 3.5 | 50 | 34 |
| 6 | 10.9 | 3.42 | 9.0 | 84.0 | 3.9 | 42 | 38 |

[a] 150°C., 2 hr. reactions using 20 g. of extract
[b] Based on weight of starting material
[c] Mw of 337/monomeric unit assumed for extract
[d] Based on nitrogen analysis
[e] Four moles per mole of monomeric phenolic unit; theor. max. N% = 10.2

EXAMPLE 5

This example illustrates the reaction of a bark extract with methyl acrylate. The bark extract was that used in Example 1. Methyl acrylate (12 g.) and the extract (15 g.) in water (60 ml.) were transferred to a steel vessel that was sealed and placed in a laboratory oven and heated for 2 hours at 170°C. After cooling, the pH of the solution (5.13) was adjusted to 3.0 (4.5 ml. conc. HCl). The precipitate was removed by filtration and given several rinses (150 ml.) before freeze-drying to yield 9.26 g. of reaction produce. The combined filtrate and rinses were dialyzed in a sausage casing and freeze-dried to give a sticky solid, 2.03 g.

EXAMPLE 6

Reactions between the extract used in Example 5 and acrylic acid were carried out by essentially the same methods as those employed in Example 5 for methyl methacrylate. The equivalents per mole of extract were slightly lower and the pH was adjusted to 9 with NaOH prior to reaction. The results of 2 samples each in accordance with Examples 5 and 6 are set forth below in Tables IV and V respectively.

TABLE IV

(Example 5) Oven Reactions of Extract with Methyl Acrylate[a]

| Sample No. | Temp. °C. | $CH_2=CH-CO_2CH_3$ g. | mole/mole of extract[c] | Yield of ppt. Wt., %[b] | Net $CO_2H$[d] % | $CH_2=CH-CO_2H$ Incorporation[e], % | |
|---|---|---|---|---|---|---|---|
| | | | | | | As % of $CH_2=CH-CO_2CH_3$ Dosage | As % of Theoret. Maximum[f] |
| 1 | 170 | 12 | 2.93 | 59.1 | 3.7 | 14.7 | 19.0 |
| 2 | 210 | 12 | 2.93 | 57.3 | 5.7 | 22.5 | 12.4 |

TABLE V

(Example 6) Oven Reactions of Extract with Acrylic Acid[a]

| Sample No. | Temp. °C. | $CH_2=CH-CO_2H$ g. | mole/mole of extract[c] | Yield of ppt. Wt., %[b] | Net $CO_2H$,[d] % | $CH_2=CH-CO_2H$ Incorporation[e], % | |
|---|---|---|---|---|---|---|---|
| | | | | | | As % of $CH_2=CH-CO_2H$ Dosage | As % of Theoret. Maximum[f] |
| 1 | 210 | 8.4 | 2.42 | 53.5 | 5.7 | 25.4 | 19.0 |
| 2 | 250 | 8.4 | 2.42 | 56.1 | 5.5 | 24.4 | 18.2 |

[a] 2 hour reactions using 40 g. of extract.
[b] Based on weight of extract starting material.
[c] Based on Mw of 312/monomeric unit of extract.
[d] Obtained by back titration using 0.1 NHCl.
[e] Based on carboxyl content as determined by titration.
[f] Four moles per mole of monomeric phonolic unit; theor. maximum $CO_2H$% = 30%.

EXAMPLE 7

This example illustrates a typical autoclave reaction of acrolein with the alkaline bark extract of Example 1. Acrolein (42.6 g.) and the extract of Example 1 (40 g.) in water (400 ml.) were placed in an autoclave and heated with stirring for 2 hours at 170° C. After cooling, the solution was removed and transferred to a beaker where it was boiled for one hour. The solution was freeze-dried to give a nicely lyophilized brown powder, 72.3 g. Other reactions were conducted by the same general procedure, varying acrolein dosage from 14.2 g. to 85.2 g. In a further set of experiments, reaction temperature was 190° C. The results are set forth in the following Table VI.

TABLE VI

Autoclave Reactions of Extract with Acrolein[a]

| Sample No. | Temp. °C. | CH$_2$=CH–CHO g. | CH$_2$=CH–CHO mole/mole of extract[b] | Yield g. | Yield Wt. %[c] | CH$_2$=CH–CHO Incorporation[d] % |
|---|---|---|---|---|---|---|
| 1 | 170 | 14.2 | 1.98 | 47.6 | 119.0 | 87.8 |
| 2 | 170 | 28.4 | 2.96 | 63.1 | 157.8 | 92.2 |
| 3 | 170 | 42.6 | 4.94 | 72.3 | 180.7 | 87.5 |
| 4 | 170 | 56.8 | 5.92 | 81.9 | 204.7 | 84.6 |
| 5 | 170 | 71.0 | 7.90 | 94.7 | 236.8 | 85.3 |
| 6 | 170 | 85.2 | 9.88 | 103.2 | 258.0 | 82.4 |
| 7 | 190 | 14.2 | 1.98 | 47.3 | 118.2 | 87.2 |
| 8 | 190 | 28.4 | 2.96 | 58.7 | 146.8 | 85.8 |
| 9 | 190 | 42.6 | 4.94 | 69.2 | 173.0 | 83.7 |
| 10 | 190 | 71.0 | 7.90 | 84.5 | 211.0 | 76.1 |

EXAMPLE 8

This example illustrates the reaction of an alkaline bark extract with vinyl acetate. To the extract of example 1 (40 g. oven dried) in water (400 ml.) was added sodium hydroxide solution (56.4 g., 50% w/w). The solution was then placed in an autoclave and vinyl acetate (60.6 g.) was added. The solution was heated for 2 hours at 170°C. After cooling, the solution was removed and boiled for 1 hour with stirring. The solution, containing some suspended solids (pH 8.8), was adjusted to pH 3.0 with hydrochloric acid. The precipitate was removed by centrifuging and freeze-dried, 50.2 g. The light amber colored filtrate was discarded. Other reactions were conducted by the same general procedure, varying vinyl acetate dosage from 20.2 to 60.6 g. with one experiment at 190°C. The results were as follows:

TABLE VII

Autoclave Reactions of Extract with Vinyl Acetate[a]

| Sample No. | Temp. °C. | CH$_3$CO$_2$CH=CH$_2$ g. | CH$_3$CO$_2$CH=CH$_2$ mole/mole of extract[b] | NaOH g. | Yield g. | Yield wt. %[c] |
|---|---|---|---|---|---|---|
| 1 | 170 | — | — | — | 20.4 | 51.1 |
| 2 | 170 | 20.2 | 1.89 | 9.4 | 31.4 | 78.6 |
| 3 | 170 | 40.4 | 3.78 | 18.8 | 42.6 | 106.5 |
| 4 | 170 | 60.6 | 5.67 | 28.2 | 50.2 | 125.3 |
| 5 | 190 | 20.2 | 1.89 | 9.4 | 39.3 | 98.4 |

[a] 2 hour reactions using 40 g. oven dried extract.
[b] Based on Mw of 312/monomeric unit assumed for extract.
[c] Based on weight of extract.

EXAMPLE 9

This example illustrates the reaction of a sulfonated extract with acrolein. The extract was prepared by digesting an aqueous solution of coniferous tree bark in a sulfurous acid solution, concentrating and spray drying. The extract (40 g.) in water (400 ml.) was adjusted to pH 9.0 with 50% (w/w) sodium hydroxide solution (1.8 ml.). The solution was placed in an autoclave and acrolein (27 g.) was added. The solution was heated with stirring for 2 hours at 170° C. After cooling, the solution was removed and transferred to a beaker where it was boiled for 1 hour with stirring. The solution was freeze-dried, 62.0 g. The results were as follows:

TABLE VIII

Autoclave Reactions of Extract with Acrolein[a]

| Sample No. | CH$_2$=CH–CHO g. | CH$_2$=CH–CHO mole/mole of extract[d] | Yield g. | Yield Wt. %[e] | CH=CH–CHO Incorporation[f] |
|---|---|---|---|---|---|
| 1[b] | 27 | 3.95 | 60.0 | 150.0 | 89.5 |
| 2[c] | 27 | 3.95 | 62.0 | 154.9 | 90.7 |
| 3[c] | 54 | 7.90 | 84.2 | 210.8 | 88.2 |

[a] 2 hour reactions at 170° on 40 g. of extract.
[b] No adjustment to pH 9.
[c] Samples adjusted to pH 9 before addition of acrolein.
[d] Based on a Mw of 326/monomeric unit assumed for extract.
[e] Based on weight of extract (40 g.).
[f] Based on weight of product compared with total weight of starting materials (calculations for samples 2 and 3 include 1.36 g. for added sodium hydroxide).

EXAMPLE 10

The following example illustrates a typical reaction of an alkaline bark extract with maleic anhydride. The extract of Example 1 (20 g. O.D.) and powdered maleic anhydride (19 g.) were thoroughly mixed and placed in a steel vessel that was sealed and placed in a laboratory oven for 2 hours at 170° C. After cooling, water (250 ml.) was added to the contents of the oven. The mixture was placed in an osterizer for about 1 minute to finely disperse the solid material. The mixture of pH 3.5 was then adjusted to pH 9.0 with sodium hydroxide solution and then boiled, with stirring, for 1 hour. After cooling, the solution was adjusted to pH 3.0. The precipitate that formed was removed by centrifuging, rinsed and freeze-dried, 20.4 g. The filtrate and rinsings were combined and dialyzed in a sausage casing, and then freeze-dried to yield 5.2 g.

Other reactions were all conducted by the same general procedure with varying parameters such as time, temperature and quantity of maleic anhydride, as shown in Table IX below. Samples 1 through 9 were all processed without boiling at pH 9 prior to precipitation at pH 3.0. Samples 10–15 all included the pH 9 boiling step in their processing.

Three reactions were run simultaneously in the laboratory oven with one of the reactions serving as a control for use as a reference. (This is the reason for the grouping of reactions into sets of three as seen in Table IX.) Generally, the freeze-dried filtrates varied from 2 to 5 g. In many instances, I. R. spectra of the freeze-dried filtrates showed that unreacted maleic anhydride derived material had not been removed. All characterization was done on the precipitated fraction which constituted the bulk of the product.

The carboxyl content was determined by back titration with 0.1 N HCl after addition of 10 ml. of 0.15N NaOH to a sample of the precipitated fractions. Two replicate determinations were run. The samples obtained were compared with those obtained in titration of the appropriate reference material.

TABLE IX

Oven Reactions of Extract with Maleic Anhydride[a]

| Sample No. | Temp. °C. | Time Hr. | Maleic anhydride g. | mole/mole of extract[b] | Yield ppt. g. | Wt. %[c] | Net $CO_2H$[d] % |
|---|---|---|---|---|---|---|---|
| 1 | 170 | 2 | 6.4 | 1.02 | 12.4 | 62 | 0 |
| 2 | 170 | 2 | 16.0 | 2.50 | 16.2 | 81 | 9.0 |
| 3 | 170 | 2 | — | — | 10.9 | 55 | Reference |
| 4 | 170 | 4 | 6.4 | 1.02 | 15.2 | 76 | 2.3 |
| 5 | 170 | 4 | 16.0 | 2.50 | 18.6 | 93 | 6.3 |
| 6 | 170 | 4 | — | — | 12.8 | 64 | Reference |
| 7 | 140 | 4 | 6.4 | 1.02 | 14.7 | 74 | 2.3 |
| 8 | 140 | 4 | 16.0 | 2.50 | 19.1 | 97 | 8.3 |
| 9 | 140 | 4 | — | — | 10.3 | 52 | Reference |
| 10[e] | 170 | 2 | 19.0 | 2.96 | 20.4 | 102 | 7.4 |
| 11 | 170 | 2 | 25.0 | 3.90 | 27.7 | 139 | 8.5 |
| 12[f] | 170 | 2 | — | — | — | — | Reference |
| 13[g] | 170 | 1 | 40.0 | 6.25 | 27.5 | 138 | 5.3 |
| 14 | 170 | 1 | 60.0 | 9.40 | 30.4 | 152 | 0 |
| 15 | 170 | 1 | — | — | 14.4 | 72 | Reference |

[a] Reactions carried out on 20 g. O.D. extract.
[b] Based on Mw of 312/monomeric unit assumed for extract.
[c] Based on weight extract (20 g.).
[d] Obtained by back titration using 0.1N HCl.
[e] All samples prepared for 10 through 15 were boiled at pH 9 prior to the pH 3 precipitation step.
[f] This reference sample was prepared by boiling Sample 3 in water at pH 9 for 1 hour and then precipitation at pH 3.
[g] An exothermic reaction occurred during the reaction that caused reaction to go to 190°. The reaction was stopped after 1 hour for this reason.

EXAMPLE 11

The following example illustrates a typical reaction of a sulfonated extract (that of Example 9) with maleic anhydride. The extract (20 g.) and powdered maleic anhydride (19 g.) were thoroughly mixed and added to a steel vessel that was sealed and placed in a laboratory oven for 2 hours at 170°C. After cooling, water (250 ml.) was added to the contents of the vessel. The mixture was placed in an osterizer for about one minute to finely disperse the solid material. The mixture of pH 3.3 was then adjusted to pH 3.0. The precipitate that formed was removed by centrifuging, rinsed and freezedried to yield 19.8 g. The filtrate and rinsings were combined and dialyzed in a sausage casing, and then freeze-dried, 3.80 g.

Other reactions were conducted by the same general procedure with varying parameters such as time, temperature and quantity of maleic anhydride as shown in Table X below. Samples 1 through 6 were processed without boiling at pH 9 for 1 hour prior to precipitation at pH 3.0. Samples 7–12 included a pH 9 boiling step preceding precipitation in their processing.

Three reactions were run simultaneously in the laboratory oven with one of the reactions serving as a control for use as a reference (this is why the reactions are grouped into sets of three as seen in Table X). Generally, the freeze-dried filtrates varied from 2 to 11 g. In many instances, i.r. spectra showed that material derived from unreacted maleic anhydride had not been removed. All characterization was done on the precipitated fraction which constituted the bulk of the product in all but one instance, Sample 5.

The carboxyl content was determined by back titration with 0.1N HCl after addition of an aliquot of base (10 ml. of 0.15N NaOH) to a sample of the precipitated fractions. Two replicate determinations were run. Titration values obtained for the appropriate reference materials were subtracted from those obtained on the precipitated fractions to obtain the net carboxyl content recorded in Table X.

TABLE X

Oven Reactions of Extract with Maleic Anhydride[a]

| Sample No. | Temp. °C. | Time Hour | Maleic Anhydride g. | mole/mole of extract[b] | Yield of ppt. g. | Wt.%[c] | Net $CO_2H$[d] % |
|---|---|---|---|---|---|---|---|
| 1 | 170 | 2 | 5.9 | 1.10 | 16.2 | 81 | 7.33 |
| 2 | 170 | 2 | 14.8 | 2.81 | 19.6 | 98 | 16.23 |
| 3 | 170 | 2 | — | — | 5.7 | 29 | Reference |
| 4 | 140 | 2 | 5.9 | 1.10 | 12.7 | 64 | 6.71 |
| 5 | 140 | 2 | 14.8 | 2.81 | 7.8 | 39 | 11.77 |
| 6 | 140 | 2 | — | — | 0 | 0 | Reference |

TABLE X

Oven Reactions of Extract with Maleic Anhydride[a]

| Sample No. | Temp. °C. | Time Hour | Maleic Anhydride g. | Maleic Anhydride mole/mole of extract[b] | Yield of ppt. g. | Yield of ppt. Wt.%[c] | Net $CO_2H$[d] % |
|---|---|---|---|---|---|---|---|
| 7[f] | 170 | 2 | 18.0 | 3.42 | 13.8 | 69 | 9.49 |
| 8 | 170 | 2 | 24.0 | 4.56 | 10.6 | 53 | 12.21 |
| 9 | 170 | 2 | — | — | 1.9 | 10 | Referenced |
| 10 | 170 | 2 | 40.0 | 7.60 | 15.6 | 78 | Undetermined |
| 11 | 170 | 2 | 60.0 | 11.40 | 35.1 | 176 | do. |
| 12 | 170 | 2 | — | — | 1.9 | 10 | do. |

[a] Reactions carried out on 20 g. extract.
[b] Based on Mw of 326/monomeric unit assumed for extract.
[c] Based on weight of extract (20 g.).
[d] Obtained by back titration using 0.1N HCl. To obtain net $CO_2H$%, titration values obtained in reference materials were subtracted.
[e] No precipitate was obtained from this reaction, the dialyzed freeze-dried filtrate was used as a reference.
[f] All samples prepared from Samples 7 through 12 were boiled at pH 9 prior to pH 3 precipitation.

We claim:

1. Etherified polyphenolic derivatives produced by reacting at a temperature of from 110° to 260°C in the presence of an alkaline catalyst a polyphenolic extract selected from the class consisting of bark polyphenolic extracts and condensed tannin wood extracts with an olefin of the formula

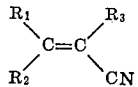

in which $R_1$, $R_2$ and $R_3$ are the same or different and are from the group consisting of H and 1 to 3 carbon alkyl, the mole/mole ratios of olefin reactant to monomeric unit in the polyphenolics ranging from about 1:1 to 10:1.

2. The etherified polyphenolic derivative of claim 1 in which the extract is an alkaline extract of coniferous tree bark.

3. The etherified polyphenolic derivative of claim 1 in which the extract is a condensed tannin from quebracho wood.

4. The etherified polyphenolic derivative of claim 2 in which the bark extract is sulfonated.

5. An etherified polyphenolic derivative produced by reacting at a temperature of 110°–260°C in the presence of an alkaline catalyst a bark polyphenolic extract with acrylonitrile, the mole/mole ratios of acrylonitrile to monomeric unit in the polyphenolics ranging from about 1:1 to 10:1.

* * * * *